US012737188B2

(12) United States Patent
Berger et al.

(10) Patent No.: US 12,737,188 B2
(45) Date of Patent: Sep. 15, 2026

(54) CROSS DRAWER MESSAGE PASSING IN A STRONGLY ORDERED COHERENT SYMMETRIC MULTIPROCESSING (SMP) CACHE

(71) Applicant: International Business Machines Corporation, Armonk, NY (US)

(72) Inventors: Deanna Postles Dunn Berger, Hyde Park, NY (US); Peter Kenneth Szwed, Rhinebeck, NY (US); Andrew Walter Piechowski, Lagrangeville, NY (US); Robert J Sonnelitter, III, Bedford Hills, NY (US); Eberhard Engler, Tübingen (DE); Michael Fee, Cold Spring, NY (US); Tal Sostheim, Kiryat Tivon (IL); Ekaterina M. Ambroladze, Ridgefield, CT (US)

(73) Assignee: International Business Machines Corporation, Armonk, NY (US)

(*) Notice: Subject to any disclaimer, the term of this patent is extended or adjusted under 35 U.S.C. 154(b) by 33 days.

(21) Appl. No.: 19/073,110

(22) Filed: Mar. 7, 2025

(65) Prior Publication Data

US 2026/0267653 A1 Sep. 10, 2026

(51) Int. Cl.
*G06F 9/38* (2018.01)

(52) U.S. Cl.
CPC .......... *G06F 9/3877* (2013.01); *G06F 9/3802* (2013.01)

(58) Field of Classification Search
CPC ............................ G06F 9/3802; G06F 9/3877
See application file for complete search history.

(56) References Cited

U.S. PATENT DOCUMENTS

| | | | | |
|---|---|---|---|---|
| 9,336,146 | B2 * | 5/2016 | Solihin | G06F 12/0804 |
| 9,495,202 | B2 | 11/2016 | Gschwind et al. | |
| 10,061,586 | B2 | 8/2018 | Gschwind et al. | |
| 11,243,770 | B2 | 2/2022 | Gschwind et al. | |
| 11,782,777 | B1 * | 10/2023 | Alexander | G06F 11/0724 714/49 |
| 11,954,528 | B2 | 4/2024 | Guim Bernat et al. | |

(Continued)

OTHER PUBLICATIONS

Authors et. al.: Disclosed Without Attribution, IP.com No. IPCOM000229293D, "Low Latency Kernel-Level Interpartition Communications via Shared-Memory IO", Jul. 18, 2013, 6 pages.

(Continued)

*Primary Examiner* — Zachary K Huson
(74) *Attorney, Agent, or Firm* — Cantor Colburn LLP; Edward Wixted

(57) ABSTRACT

A computer-implemented method includes issuing an operation to a first core of a multicore processor. The operation includes transmitting a message from the first core to a second core of the multicore processor. Transmitting the message includes defining a payload including, providing the payload to a nest fabric of the first core and capturing the source address and the destination address, initiating a fetch to capture the message and store the message in a in a second cache of the second core, removing the message from the first core, and the second core fetching the message from the second cache, and returning a condition code to the first core without pulling the destination address back to the first core.

20 Claims, 4 Drawing Sheets

(56) References Cited

U.S. PATENT DOCUMENTS

| | | | | |
|---|---|---|---|---|
| 2016/0117246 | A1* | 4/2016 | Maurice | G06F 12/14 711/130 |
| 2020/0301831 | A1* | 9/2020 | Wilson | G06F 12/0831 |
| 2021/0374059 | A1* | 12/2021 | Joao | G06F 12/0895 |
| 2022/0197726 | A1* | 6/2022 | Beckmann | G06F 12/0815 |
| 2024/0103767 | A1 | 3/2024 | Chen et al. | |

OTHER PUBLICATIONS

Authors et. al.: Disclosed Without Attribution, IP.com No. IPCOM000260034D, "A Method and System for Building a Cache-coherent Hybrid and Concurrent Hash Table using IBM NVLink2" Oct. 11, 2019, 4 pages.

Authors et. al.: IBM, IP.com No. IPCOM000192774D, "A Method for Message Passing Interface (MPI) Process Mapping to Minimize the Communication Latency on Symmetric Multiprocessor (SMP) and Multicore Architectures", Feb. 2, 2010, 3 pages.

Calciu et al., "Message Passing or Shared Memory: Evaluating the Delegation Abstraction for Multicores". Lecture Notes in Computer Science, 2013, pp. 83-97.

Debendra Das Sharma, "Evolution of Interconnects and Fabrics to Support Future Compute Infrastructure", Open Fabrics Alliance, 2021, 18 pages.

Hennessy et al., "Cache-Coherent Distributed Shared Memory: Perspectives on Its Development and Future Challenges" Proceedings of the IEEE, , Mar. 1999, pp. 418-429.

Mariani et al., "Semantic Matching of GUI Events for Test Reuse: Are We There Yet?", ISSTA '21, Jul. 11-17, 2021, pp. 177-190.

Petrovic et al., "Leveraging Hardware Message Passing for Efficient Thread Synchronization", HAL open Science, Mar. 2, 2015, 13 pages.

* cited by examiner

CROSS DRAWER MESSAGE PASSING IN A STRONGLY ORDERED COHERENT SYMMETRIC MULTIPROCESSING (SMP) CACHE

BACKGROUND

The present invention generally relates to symmetric multiprocessing cache operations, and more specifically to efficient cross drawer message passing in the same.

Symmetric multiprocessing (SMP) involves a multiprocessor computer hardware and software architecture where two or more identical processors are connected to a single, shared main memory, have full access to all input and output devices, and are controlled by a single operating system instance that treats all processors equally, reserving none for special purposes. Most multiprocessor systems use an SMP architecture. In the case of multi-core processors, the SMP architecture applies to the cores, treating them as separate processors.

SUMMARY

Embodiments of the present invention are directed to a computer-implemented method for implementing low latency cross drawer communications. A non-limiting example of the computer-implemented method includes issuing an operation to a first core of a multicore processor. The operation includes transmitting a message from the first core to a second core of the multicore processor. Transmitting the message includes defining a payload including, providing the payload to a nest fabric of the first core and capturing the source address and the destination address, initiating a fetch to capture the message and store the message in a in a second cache of the second core, removing the message from the first core, and the second core fetching the message from the second cache, and returning a condition code to the first core without pulling the destination address back to the first core.

Embodiments of the present invention are further directed to a system and a computer program product for implementing the same low latency cross drawer communications. The computer program product comprising a computer readable storage medium having program instructions embodied therewith. The program instructions are executable by a processor to cause the processor to perform a method.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
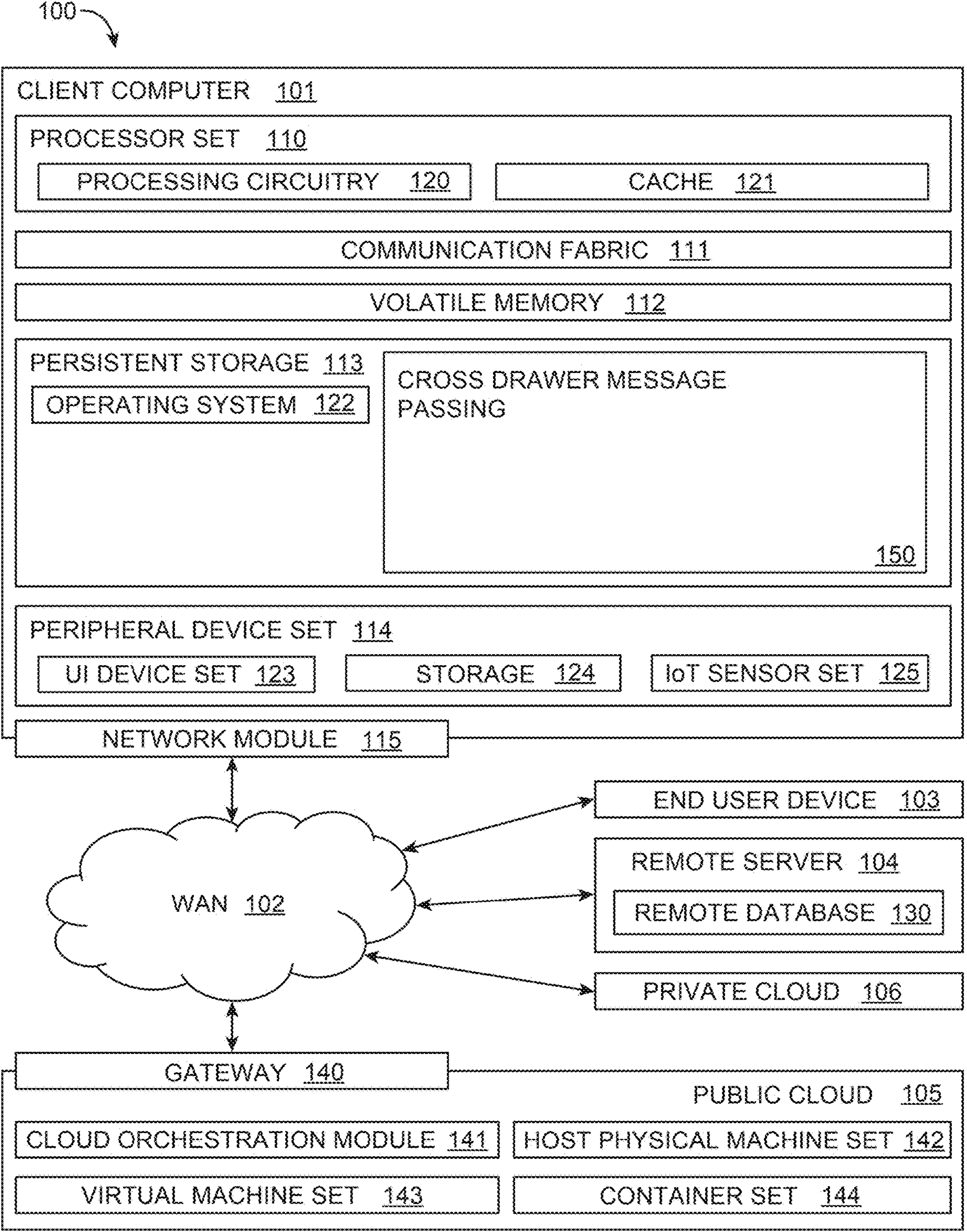
FIG. 1 depicts one exemplary cloud computing system configured to implement the system and method according to one embodiment.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In one exemplary embodiment, a computer-implemented method includes issuing an operation to a first core of a multicore processor. The operation includes transmitting a message from the first core to a second core of the multicore processor. Transmitting the message includes defining a payload including, providing the payload to a nest fabric of the first core and capturing the source address and the destination address, initiating a fetch to capture the message and store the message in a in a second cache of the second core, removing the message from the first core, and the second core fetching the message from the second cache, and returning a condition code to the first core without pulling the destination address back to the first core. The process decreases a latency incurred in transmission of messages across caches.

In another embodiment of the computer-implemented method the payload includes a source address of the message, a destination address of the message and a destination key of the message. Provision of the destination address facilitates providing the message across drawers in a cross drawer communication.

In another embodiment of the computer-implemented method, issuing the operation to the first core of the multicore processor includes determining the first core is disposed on a first drawer and the second core are disposed on a second drawers, thereby allowing the process to be selectively utilized in instances where the latency benefits of this process are best realized.

In another embodiment of the computer-implemented method, the operation allows an L1 cache on the second drawer of the distinct drawers to retain a read only copy of the message without requiring the message to be retained on the first drawer, thereby reducing a cache size required to implement the operation.

In another embodiment of the computer-implemented method, the operation is issued from a firmware to a hardware apparatus, and wherein the hardware apparatus is configured to receive the operation from the firmware, pull a data line from a source location on the first drawer, associate a destination address with the data line, and push the data line to the destination address on the second drawer, and store the data line in an L2 cache of the second drawer. This embodiment provides a beneficial physical structure for implementing the operation.

In another embodiment of the computer-implemented method, the operation is issued from a firmware to a hardware apparatus, and wherein the hardware apparatus is configured to receive the operation from the firmware, pull a destination address and an offset and length from a source location on the first drawer, associate a destination address with offset and the length, and push the destination address with offset and the length to the destination address on the second drawer, wherein the destination address and the length is configured to enable a subset of a data line to be merged into a preexisting data line at the destination address thereby reducing a size of the message being transmitted.

In another embodiment of the computer-implemented method, determining the first core is disposed on a first drawer and the second core are disposed on a second drawer includes a static determination, and where the static determination is made during cross-partition-channel initialization of the multicore processor thereby reducing a number of steps required to implemented the process when a new message is issued.

In another embodiment of the computer-implemented method, determining the first core is disposed on a first drawer and the second core are disposed on a second drawers occurs immediately prior to issuing the operation thereby allowing the implementation to be adaptable to changing hardware configurations.

In another embodiment the computer-implemented method further includes responding to the first core and the second core being on a first drawer by replacing the defining the payload including the source address of the message, the destination address of the message and the destination key of the message, providing the payload to the nest fabric of the first core and capturing the source address and the destination address, initiating the fetch to capture the message and store the message in the second cache of the second core, removing the message from the first core, and the second core fetching the message from the second cache with a memory based fetch and store message transmission process thereby improving the latency of operations when the first core and the second core are on the same drawer.

In another embodiment of the computer-implemented method the payload includes a destination address and an offset, and wherein a length and bit set/reset indicator of the offset is configured to enable a subset of a data line to be set or reset and merged into an existing data line at the destination.

In another embodiment a computer system includes a processor set including at least one multicore processor, the at least one multicore processor including a plurality of cores arranged in a plurality of drawers. The at least one multicore processor is configured to issue an operation to a first core of a multicore processor, the operation including transmitting a message from the first core to a second core of the multicore processor. Transmitting the message includes defining a payload including a source address of the message, a destination address of the message and a destination key of the message, providing the payload to a nest fabric of the first core and capturing the source address and the destination address, initiating a fetch to capture the message and store the message in a in a second cache of the second core, removing the message from the first core, and the second core fetching the message from the second cache, and returning a condition code to the first core without pulling the destination address back to the first core, thereby providing a physical system configured to implement the embodiments of the computer-implemented processes.

In another embodiment, issuing the operation to the first core of the multicore processor includes determining the first core is disposed on a first drawer and the second core are disposed on a second drawers thereby allowing the process to be utilized in conditions where the latency benefits are most prevalent.

In another embodiment, the operation allows an L1 cache on the second drawer of the distinct drawers to retain a read only copy of the message without requiring the message to be retained on the first drawer, thereby reducing an amount of cache space required to implement the operation.

In another embodiment, the operation is issued from a firmware to a hardware apparatus, and wherein the hardware apparatus is configured to receive the operation from the firmware, pull a data line from a source location on the first drawer, associate a destination address with the data line, and push the data line to the destination address on the second drawer, and store the data line in an L2 cache of the second drawer, thereby providing further structure for beneficially implementing the operation.

In another embodiment, the operation is issued from a firmware to a hardware apparatus, and wherein the hardware apparatus is configured to receive the operation from the firmware, pull a destination address and an offset and length from a source location on the first drawer, associate a destination address with offset and the length, and push the destination address with offset and the length to the destination address on the second drawer, wherein the destination address and the length is configured to enable a subset of a data line to be merged into a preexisting data line at the destination address thereby reducing a size of the message being transmitted.

In another embodiment, determining the first core is disposed on a first drawer and the second core are disposed on a second drawer includes a static determination, and where the static determination is made during cross-partition-channel initialization of the multicore processor thereby reducing a required time for implementing the operation.

In another embodiment, determining the first core is disposed on a first drawer and the second core are disposed on a second drawers occurs immediately prior to issuing the operation thereby allowing the process to be adaptable to changing hardware configurations.

In another embodiment, responding to the first core and the second core being on a first drawer by replacing the defining the payload including the source address of the message, the destination address of the message and the destination key of the message, providing the payload to the nest fabric of the first core and capturing the source address and the destination address, initiating the fetch to capture the message and store the message in the second cache of the second core, removing the message from the first core, and the second core fetching the message from the second cache with a memory based fetch and store message transmission process, thereby improving the latency of operations when the first core and the second core are on the same drawer In another embodiment, a computer program product includes a non-transitory memory storing instructions configured to cause a multicore processor to perform a process including transmitting a message from the first core to a second core of the multicore processor. Transmitting the message includes defining a payload including, providing the payload to a nest fabric of the first core and capturing the source address and the destination address, initiating a fetch to capture the message and store the message in a in a second cache of the second core, removing the message from the first core, and the second core fetching the message from the second cache, and returning a condition code to the first core without pulling the destination address back to the first core. The process decreases a latency incurred in transmission of messages across caches. The computer-program product facilitates distribution of the process to, and installation of the process in, multiple systems.

In another embodiment of the computer-program product, issuing the operation to the first core of the multicore processor includes determining the first core is disposed on a first drawer and the second core are disposed on a second drawers thereby ensuring that the process is utilized in configurations where the process is most beneficial.

Computing environment 100 contains an example of an environment for the execution of at least some of the computer code involved in performing the inventive methods, such as cross drawer message passing at block 150. In addition to block 150, computing environment 100 includes, for example, computer 101, wide area network (WAN) 102, end user device (EUD) 103, remote server 104, public Cloud 105, and private Cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI), device set 123, storage 124, and Internet of Things (IoT) sensor set 125), and network module 115. Remote server 104 includes remote database 132. Public Cloud 105 includes gateway 130, Cloud orchestration module 131, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 132. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a Cloud, even though it is not shown in a Cloud in FIG. 1. On the other hand, computer 101 is not required to be in a Cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collects and store helpful and useful data for use by other computers, such as computer 101. For example, in a hypothetical case where computer 101 is designed and programmed to provide a recommendation based on historical data, then this historical data may be provided to computer 101 from remote database 132 of remote server 104.

PUBLIC CLOUD 105 is any computer system available for use by multiple entities that provides on-demand availability of computer system resources and/or other computer capabilities, especially data storage (Cloud storage) and computing power, without direct active management by the user. Cloud computing typically leverages sharing of resources to achieve coherence and economies of scale. The direct and active management of the computing resources of public Cloud 105 is performed by the computer hardware and/or software of Cloud orchestration module 141. The computing resources provided by public Cloud 105 are typically implemented by virtual computing environments that run on various computers making up the computers of host physical machine set 142, which is the universe of physical computers in and/or available to public Cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public Cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public Cloud 105, except that the computing resources are only available for use by a single enterprise. While private Cloud 106 is depicted as being in communication with WAN 102, in other embodiments a private Cloud may be disconnected from the internet entirely and only accessible through a local/private network. A hybrid Cloud is a composition of multiple Clouds of different types (for example, private, community or public Cloud types), often respectively implemented by different vendors. Each of the multiple Clouds remains a separate and discrete entity, but the larger hybrid Cloud architecture is bound together by standardized or proprietary technology that enables orchestration, management, and/or data/application portability between the multiple constituent Clouds. In this embodiment, public Cloud 105 and private Cloud 106 are both part of a larger hybrid Cloud.

One or more embodiments described herein can utilize machine learning techniques to perform prediction and or classification tasks, for example. In one or more embodiments, machine learning functionality can be implemented using an artificial neural network (ANN) having the capability to be trained to perform a function. In machine learning and cognitive science, ANNs are a family of statistical learning models inspired by the biological neural networks of animals, and in particular the brain. ANNs can be used to estimate or approximate systems and functions that depend on a large number of inputs. Convolutional neural networks (CNN) are a class of deep, feed-forward ANNs that are particularly useful at tasks such as, but not limited to analyzing visual imagery and natural language processing (NLP). Recurrent neural networks (RNN) are another class of deep, feed-forward ANNs and are particularly useful at tasks such as, but not limited to, unsegmented connected handwriting recognition and speech recognition. Other types of neural networks are also known and can be used in accordance with one or more embodiments described herein.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons are then passed to other downstream neurons, which are often referred to as "hidden" neurons. This process is repeated until an output neuron is activated. The activated output neuron determines which character was input.

A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Turning now to an overview of technologies that are more specifically relevant to aspects of the invention, SMP systems have centralized shared memory called main memory (MM) operating under a single operating system with two or more homogeneous processors. Usually, each processor has an associated private high-speed memory known as cache memory (or cache) to speed up the main memory data access and to reduce the system bus traffic.

Processors may be interconnected using buses, crossbar switches or on-chip mesh networks. The bottleneck in the scalability of SMP using buses or crossbar switches is the bandwidth and power consumption of the interconnect among the various processors, the memory, and the disk arrays. Mesh architectures avoid these bottlenecks, and provide nearly linear scalability to much higher processor counts at the sacrifice of programmability:

Serious programming challenges remain with this kind of architecture because it requires two distinct modes of programming; one for the CPUs themselves and one for the interconnect between the CPUs. A single programming language would have to be able to not only partition the workload, but also comprehend the memory locality, which is severe in a mesh-based architecture.

SMP systems allow any processor to work on any task no matter where the data for that task is located in memory, provided that each task in the system is not in execution on two or more processors at the same time. With proper operating system support, SMP systems can easily move tasks between processors to balance the workload efficiently.

Memory-based message passing between processes working on different drawers within a coherent SMP cache results in significant latency penalties. The latency penalties can arise due at least in part to the strong store ordering, modified-MOESI coherency protocol and sequential memory consistency inherent to the given architecture. By way of example, some architectures require a line to be first fetched exclusive (FEX) by a core before the core can be stored to. Latency penalties can also arise due to system topology, which may require traversing between on-drawer modules to reach the off-drawer (ABUS) connection.

Existing processes for cross-drawer message passing use a traditional fetch transaction (FEX) and store of a single line address. These processes require the cross drawer (ABUS) latency to be incurred a total of 5 times for a processor on Drawer X to write a message in a line owned by the process running on Drawer Y and then have Drawer Y fetch it back to read the message. Previous latency mitigation attempts have applied to all off-drawer transfers and were HW focused, involved logic, physical design and/or interface clocking complexity.

The systems and processes described herein reduce the latency in a high-value subset of cross-drawer transfers by providing a new system operation flow. The new system operation flow yields 25-30% reduction in latency and enables firmware capability to identify one or more conditions in which usage of the new flow provides a benefit to performance.

Turning now to an overview of the aspects of the invention, one or more embodiments of the invention address the above-described shortcomings of the prior art by providing a cross-partition message protocol able to be initiated using firmware (FW) to write data into a line in a level 2 (L2) cache of a different partition while simultaneously allowing the different partition's level 1 (L1) cache on a second drawer to retain a read only (RO) copy and without requiring the line to be pulled to the first partition's L1 cache on the first drawer. This operation is referred to as a store-in-place instruction.

The systems and processes include a hardware (HW) apparatus that receives the protocol request from the FW, pulls the data line from a source location of the data line on the first drawer, associates a destination address with the data line, then pushes the data line to the destination address on the second drawer and stores the data line on the L2 cache of the second drawer.

In some examples, the systems and processes include a FW determination of when utilization of the new protocol benefits cross-partition performance via determination of relative physical proximity of the HW running the two partitions. By way of example, when the partition proximity is cross-drawer, the FW uses the store-in-place instruction. When the partition proximity is intra-drawer, the FW uses existing memory-based message passing (fetch and store) operations. In some examples, the FW may also incorporate other system information besides proximity into the decision to utilize the store-in-place operation, such as the relative ratio between FW system operation initialization and the cross-drawer latency savings differential.

Determination of the partition location is, in some examples, static at the time of cross-partition-channel initialization. Determination of the partition location is, in other examples, dynamic and is communicated in each message.

The above-described aspects of the invention address the shortcomings of the prior art by providing a new cross-partition message passing protocol initiated by FW to write data directly into a line on a different partition's L2 cache while, at the same time, allowing the other partition's L1 cache (on Drawer B) to retain a RO copy. This is accomplished without requiring the line to be pulled to the first partition's L1 (on Drawer A).

In addition, a HW apparatus is included that receives the protocol request from FW, pulls the data line from its source location on Drawer A, associates a destination address with the data line, and pushes the data line to destination address on Drawer B. The data line is then stored in the L2.

In some examples, the HW apparatus can include a "partial store" variation where, instead of storing the entire data line, the destination address is accompanied with an offset and length. The offset and length enables a subset of the data line to be merged into the existing data line at the destination L2.

In some examples, the HW apparatus includes a "bit set/reset" variation where no data is moved. Instead the destination address is accompanied with an offset. In this variation, a length and bit set/reset indicator enables a subset of the data line to be set or reset and merged into the existing data line at the destination L2.

In addition, a FW determination is included that identifies when utilization of the new protocol benefits cross-partition performance via determination of relative physical proximity of the HW running the two partitions. When partition proximity is cross-drawer, the FW utilizes the new Store-In-Place instruction. In contrast, when partition proximity is intra-drawer, the FW uses an existing memory-based message passing protocol (e.g., FEX+Store). The FW determination may incorporate other system information besides proximity into the decision to utilize Store-In-Place. The partition location determination is, in some examples, static at the time of cross-partition-channel initialization. In alternative examples, the attrition location determination is dynamic and is communicated in each message.

Figure 2:
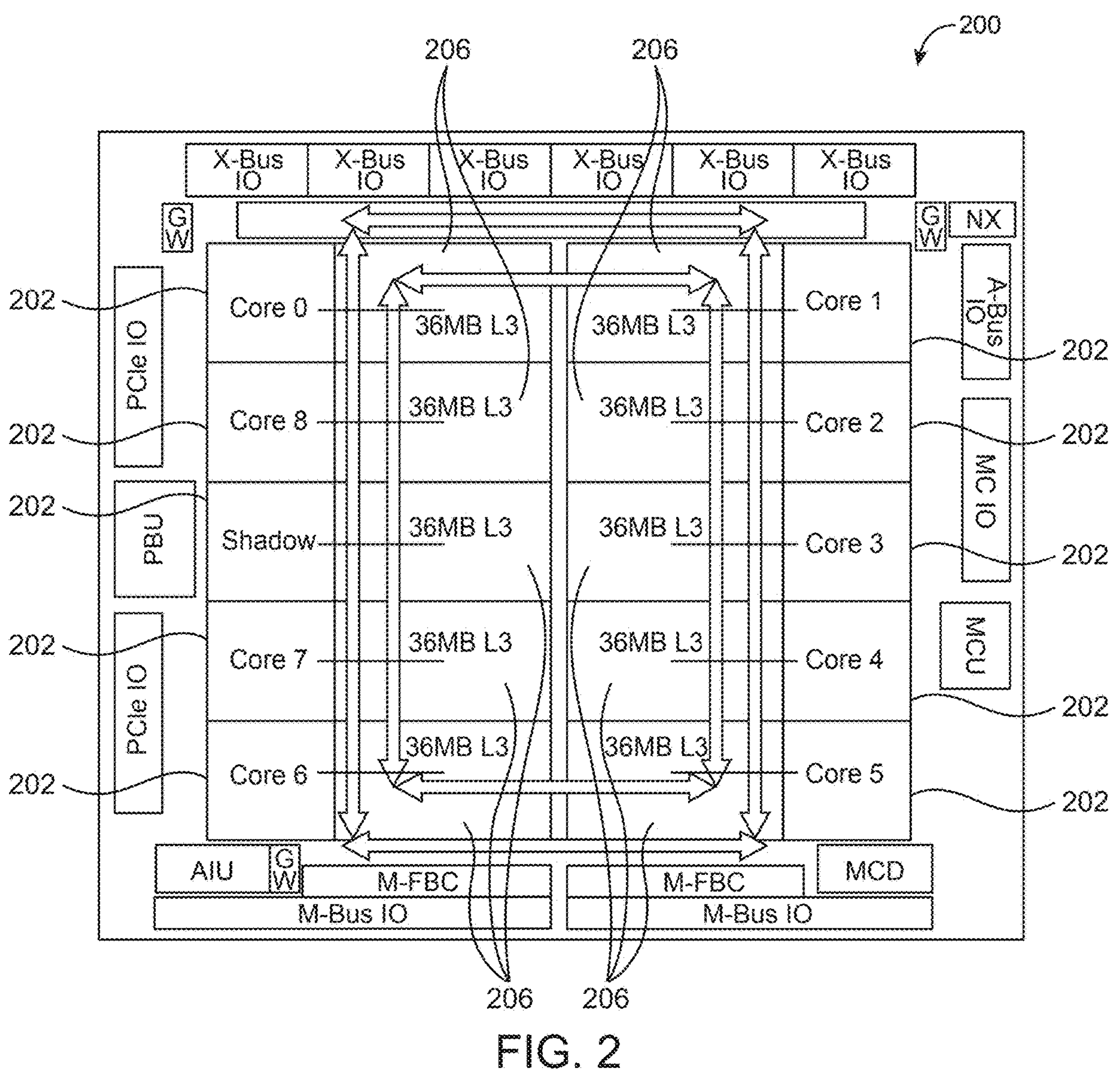
FIG. 2 depicts a multiprocessing chip layout in a first example.
Figure 3:
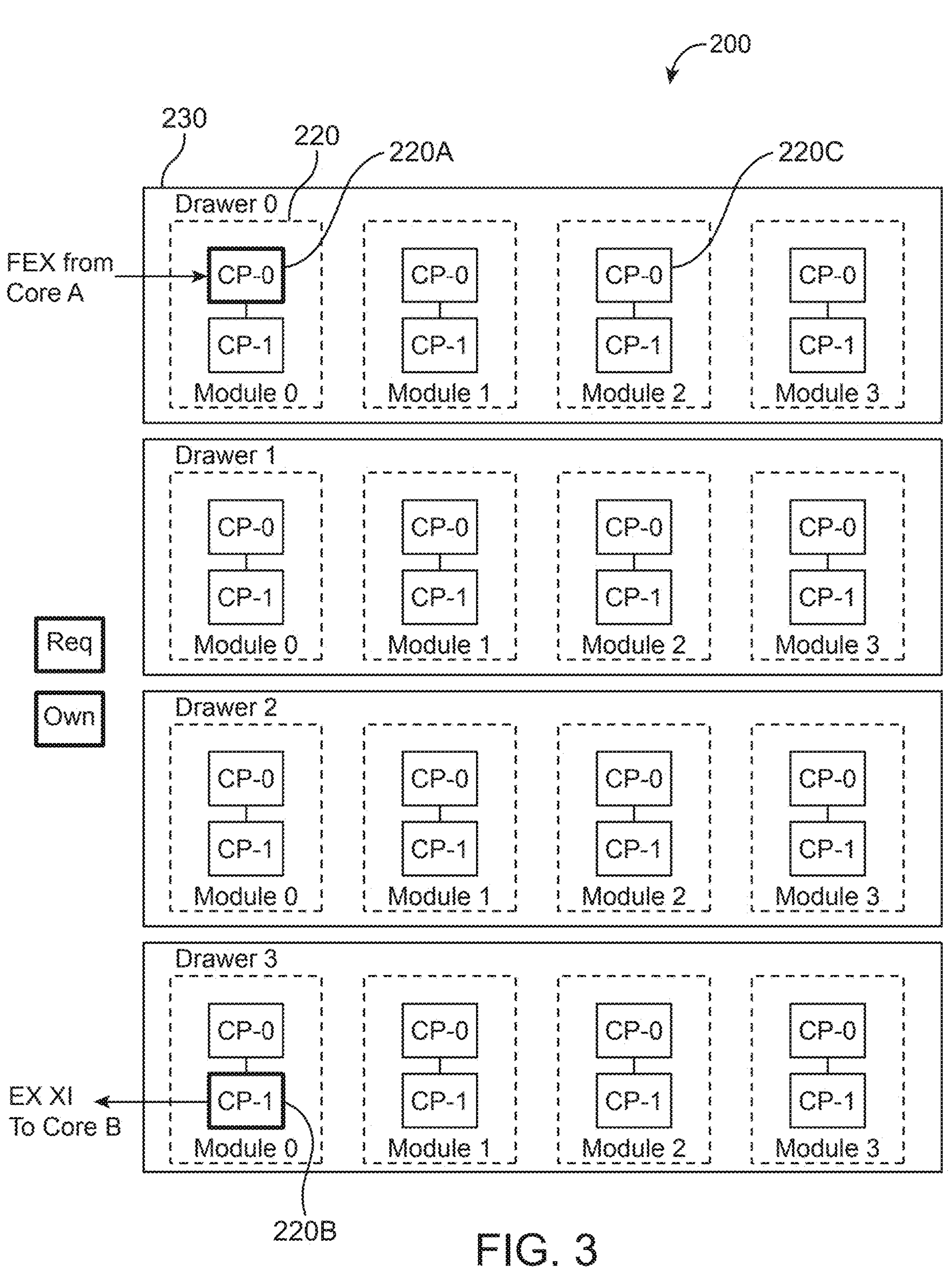
FIG. 3 depicts the multiprocessing chip of FIG. 2 schematically separated into drawers.

Turning now to a more detailed description of aspects of the present invention, FIG. 2 depicts a multicore processer 200 according to some embodiments of the invention. The illustrated multicore processor 200 includes nine cores 202 (cores 0-8) of a particular design 'z' and one core of a different design, 's' 204, with each 'z' core 202 and the 's' core 204 including a corresponding cache 206. The physical structure and connections of the multicore processor 200 are schematically illustrated in FIG. 3 with multiple core processors 220 stored physically together in a single drawer 230.

When communicating between core processors 220 within the same drawer, existing fetch/store (FEX+Store) processes can be utilized within minimal latency. Such a process operates when a first core (220A) wishes to send data to a cache on a second core 220C on the same drawer 230. However, when communicating across drawers, such as when the first core 220A wishes to communicate with a core (core 220B), substantial latency penalties associated with crossing the drawers are incurred, resulting in a longer communication time. As can be appreciated, improving communication times within a multicore processor (e.g., multicore processor 200) is considered generally beneficial within the art.

Figure 4:
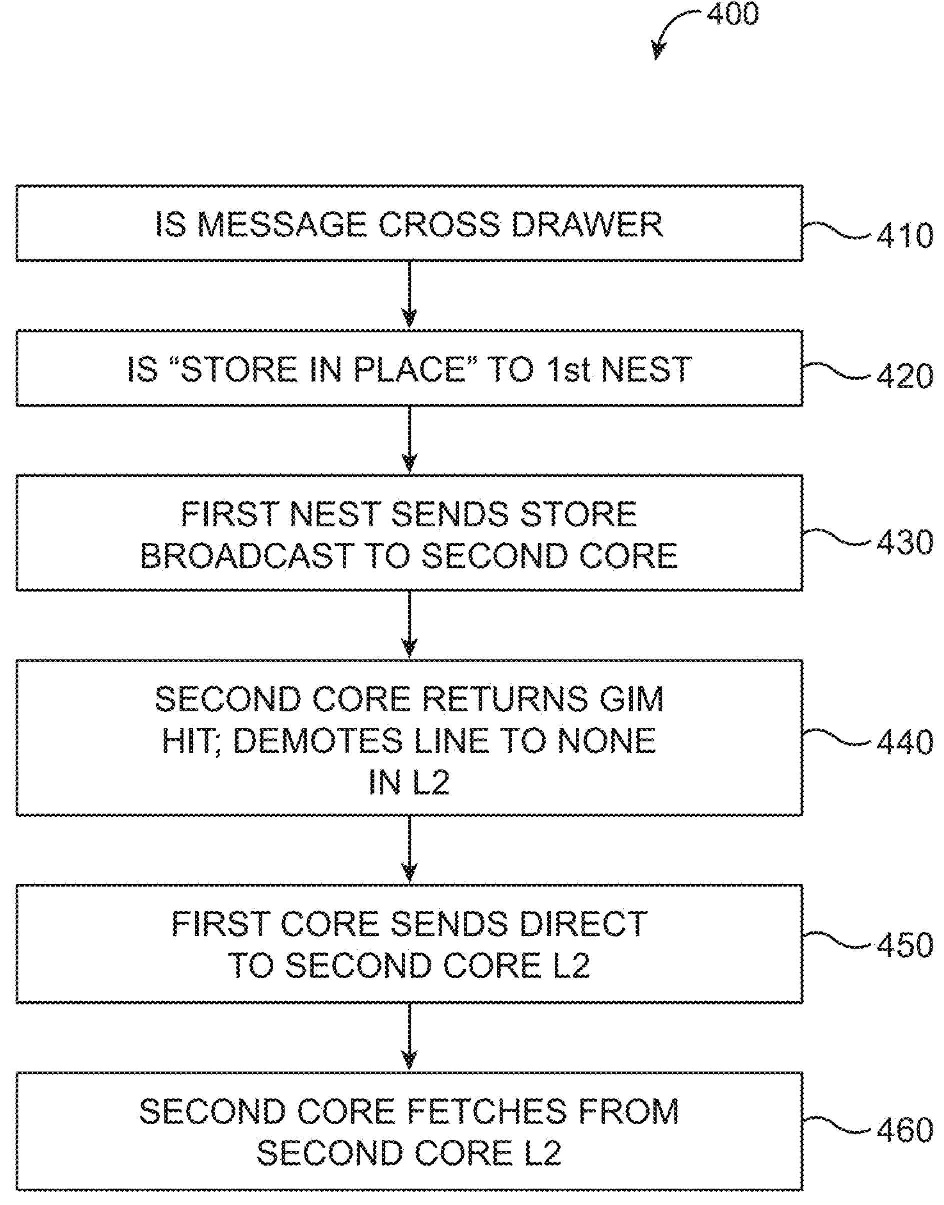
FIG. 4 depicts a method for implementing a store in place cross drawer communication process on the chip of FIGS. 2 and 3.

In order to address the latency introduced via cross-drawer communications, the multicore processor 200 includes hardware (HW) and firmware (FW) systems to implement a processors store in place data communication process. With continued reference to FIGS. 2 and 3, FIG. 4 illustrates a flowchart 400 showing the process flow of the store in place data communication process. In some examples, the "Processor Store in Place" system operation (SysOp) of FIG. 4 has performance benefits limited to circumstances where the Destination is Off-Drawer. In such cases, on-drawer targets utilizing the new SysOp are likely to perform slower than current behavior due to millicode overhead. In one embodiment, a processor may need to communicate to a second processor configured to be a "coupling controller facility" (CF). This second CF processor may or may not be on a different drawer than the first. The coupling controller facilitates IO channel communication between one or more systems. In this embodiment, during IO channel Initialization, coupling firmware code will make a static determination of whether or not the CF "Destination Location" is Off-Drawer.

The process flow is based off the overhead of the FW-millicode-processor hardware engagement required to initiate the 'Store in Place' system operation into the hardware vs. typical On-Drawer latencies. The process flow provides a benefit when the destination is off-drawer (i.e., the originating core 220A is in a different drawer 230 than the receiving core 220B.) In order to ensure that process flow 400 is used in such circumstances, initially the message is checked to determine if the message is a cross drawer message at step 410. When the message is not cross-drawer, the process 400 proceeds to use the existing conventional message transmission protocol.

When the destination is off-drawer, the process 400 proceeds to send a "store in place" message to the nest of the originating core 220A (referred to as the first nest) in a send store in place step 420. The store in place operation is a millicode-architected system operation, and is issued via millicode to the corresponding core 220. The payload includes a source address (an address of the line containing the cross-partition message) and a destination address, destination key (an address and key of the destination "mailbox" in the target partition).

The first nest the sends the stored payload to the second core at step 430. In one example, the transmission takes the form of sending both addresses, immediately following each other to nest fabric via an on-chip ring protocol. During the ring protocol, the nest HW controller on the home chip will capture both addresses and initiate a fetch to capture the message and store it in a data buffer. The nest HW controller will initiate a store query across the system.

In the nominal case, the request will hit GIM (Exclusive owned) in the target partition L2 cache, and the originating core's L1 cache is invalidated at step 440. However, the line remains in the originating core's L2 cache.

Next, Storage Protection (SP) checking is performed in the L2 cache. If the SP check is successful, then the nest HW will store the contents of the source addressed line into the target partition's L2 cache (the L2 cache of the destination core) at step 450.

Finally, a distributed cache, lookup directories and its associated control and dataflow hardware (referred to as the nest) HW returns a Condition Code (CC) to the requesting processor indicating success (CC=00) or SP Check Violation and the partition at the destination core 220 can then fetch the message from the mailbox address which is still in the L2 cache of the destination core 220.

In some examples, the destination location is stored in a line entry of the portion of the system address space reserved for hardware system management, (link control block) that the Source partition will already be using (hit in L1/L2). In some examples, a destination location is used by code to determine when to utilize Store-In-Place and when to use existing memory-based message passing. In some examples, a FW may override the proximity based decision to use Store in Place and even if the target is off drawer for certain reasons, including (but not limited to): when FW detects other prohibitive system behavior (e.g., a Partition Placement Change/Coupling Facility (CF) movement) is taking place and/or when FW needs to send a series of messages via a contiguous address space, in which case the usage of Move Page SysOp may be more efficient.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:

issuing an operation to a first core of a multicore processor, the operation including transmitting a message from the first core to a second core of the multicore processor; and wherein transmitting the message includes defining a payload including, providing the payload to a nest fabric of the first core and capturing the source address and the destination address, initiating a fetch to capture the message and store the message in a in a second cache of the second core, removing the message from the first core, and the second core fetching the message from the second cache, and returning a condition code to the first core without pulling the destination address back to the first core.

2. The computer-implemented method of claim 1, wherein the payload includes a source address of the message, a destination address of the message and a destination key of the message.

3. The computer-implemented method of claim 2, wherein issuing the operation to the first core of the multicore processor includes determining the first core is disposed on a first drawer and the second core are disposed on a second drawers.

4. The computer-implemented method of claim 3, wherein the operation allows an L1 cache on the second drawer of the distinct drawers to retain a read only copy of the message without requiring the message to be retained on the first drawer.

5. The computer-implemented method of claim 4, wherein the operation is issued from a firmware to a hardware apparatus, and wherein the hardware apparatus is configured to receive the operation from the firmware, pull a data line from a source location on the first drawer, associate a destination address with the data line, and push the data line to the destination address on the second drawer, and store the data line in an L2 cache of the second drawer.

6. The computer-implemented method of claim 4, wherein the operation is issued from a firmware to a hardware apparatus, and wherein the hardware apparatus is configured to receive the operation from the firmware, pull a destination address and an offset and length from a source location on the first drawer, associate a destination address with offset and the length, and push the destination address with offset and the length to the destination address on the second drawer, wherein the destination address and the length is configured to enable a subset of a data line to be merged into a preexisting data line at the destination address.

7. The computer-implemented method of claim 4 wherein determining the first core is disposed on a first drawer and the second core are disposed on a second drawer includes a static determination, and where the static determination is made during cross-partition-channel initialization of the multicore processor.

8. The computer-implemented method of claim 4, wherein determining the first core is disposed on a first drawer and the second core are disposed on a second drawers occurs immediately prior to issuing the operation.

9. The computer-implemented method of claim 2, further comprising responding to the first core and the second core being on a first drawer by replacing the defining the payload including the source address of the message, the destination address of the message and the destination key of the message, providing the payload to the nest fabric of the first core and capturing the source address and the destination address, initiating the fetch to capture the message and store the message in the second cache of the second core, removing the message from the first core, and the second core fetching the message from the second cache with a memory based fetch and store message transmission process.

10. The computer-implemented method of claim 1, wherein the payload includes a destination address and an offset, and wherein a length and bit set/reset indicator of the offset is configured to enable a subset of a data line to be set or reset and merged into an existing data line at the destination.

11. A computer system comprising;

a processor set including at least one multicore processor, the at least one multicore processor including a plurality of cores arranged in a plurality of drawers;

wherein the at least one multicore processor is configured to issue an operation to a first core of a multicore processor, the operation including transmitting a message from the first core to a second core of the multicore processor; and wherein transmitting the message includes defining a payload including a source address of the message, a destination address of the message and a destination key of the message, providing the payload to a nest fabric of the first core and capturing the source address and the destination address, initiating a fetch to capture the message and store the message in a in a second cache of the second core, removing the message from the first core, and the second core fetching the message from the second cache, and returning a condition code to the first core without pulling the destination address back to the first core.

12. The computer system of claim 11, wherein issuing the operation to the first core of the multicore processor includes determining the first core is disposed on a first drawer and the second core are disposed on a second drawers.

13. The computer system of claim 12, wherein the operation allows an L1 cache on the second drawer of the distinct drawers to retain a read only copy of the message without requiring the message to be retained on the first drawer.

14. The computer system of claim 13, wherein the operation is issued from a firmware to a hardware apparatus, and wherein the hardware apparatus is configured to receive the operation from the firmware, pull a data line from a source location on the first drawer, associate a destination address with the data line, and push the data line to the destination address on the second drawer, and store the data line in an L2 cache of the second drawer.

15. The computer system of claim 13, wherein the operation is issued from a firmware to a hardware apparatus, and wherein the hardware apparatus is configured to receive the operation from the firmware, pull a destination address and an offset and length from a source location on the first drawer, associate a destination address with offset and the length, and push the destination address with offset and the length to the destination address on the second drawer, wherein the destination address and the length is configured to enable a subset of a data line to be merged into a preexisting data line at the destination address.

16. The computer system of claim 13 wherein determining the first core is disposed on a first drawer and the second core are disposed on a second drawer includes a static determination, and where the static determination is made during cross-partition-channel initialization of the multicore processor.

17. The computer system of claim 13, wherein determining the first core is disposed on a first drawer and the second core are disposed on a second drawers occurs immediately prior to issuing the operation.

18. The computer system of claim 11, further comprising responding to the first core and the second core being on a first drawer by replacing the defining the payload including the source address of the message, the destination address of the message and the destination key of the message, providing the payload to the nest fabric of the first core and capturing the source address and the destination address, initiating the fetch to capture the message and store the message in the second cache of the second core, removing the message from the first core, and the second core fetching the message from the second cache with a memory based fetch and store message transmission process.

19. A computer program product comprising:

a non-transitory memory storing instructions configured to cause a multicore processor to perform a process including:

issuing an operation to a first core of the multicore processor, the operation including transmitting a message from the first core to a second core of the multicore processor; and wherein transmitting the message includes defining a payload including a source address of the message, a destination address of the message and a destination key of the message, providing the payload to a nest fabric of the first core and capturing the source address and the destination address, initiating a fetch to capture the message and store the message in a in a second cache of the second core, removing the message from the first core, and the second core fetching the message from the second cache, and returning a condition code to the first core without pulling the destination address back to the first core.

20. The computer program product of claim 19, wherein issuing the operation to the first core of the multicore processor includes determining the first core is disposed on a first drawer and the second core are disposed on a second drawers.

* * * * *